Figure 1:
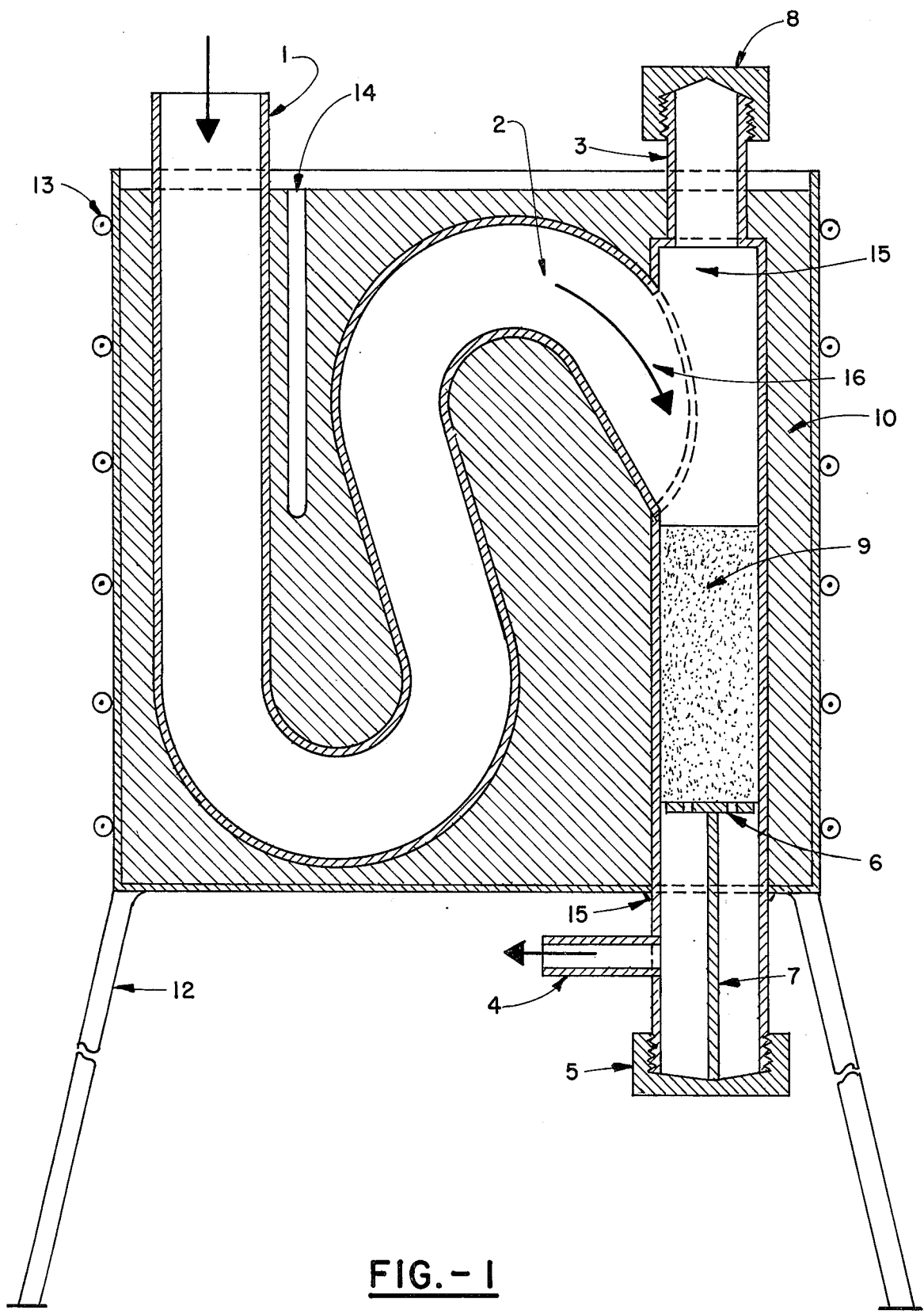

United States Patent [19]
Reid

[11] 4,071,324
[45] Jan. 31, 1978

[54] CHEMICAL REACTOR

[76] Inventor: Luther James Reid, 196 Bishops Drive, Aston, Pa. 19014

[21] Appl. No.: 691,892

[22] Filed: June 1, 1976

[51] Int. Cl.² .................. F27B 17/02; B01J 8/06
[52] U.S. Cl. ..................... 23/288 K; 23/288 J; 23/259; 23/253 R; 165/185; 165/80; 165/165; 73/422 TC
[58] Field of Search ............ 23/288 K, 259, 230 R, 23/253 R, 254 R, 277 R, 288 J; 202/262; 165/185, 80, 165; 141/83, 27; 214/18 V; 222/425, 450; 55/30, 32, 35, 478–481; 73/23, 422 TC, 25

[56] References Cited

U.S. PATENT DOCUMENTS

| | | | |
|---|---|---|---|
| 2,616,628 | 11/1952 | Guild | 165/185 X |
| 2,658,819 | 11/1953 | Formwalt | 23/253 R |
| 3,431,077 | 3/1969 | Danforth | 23/253 R |
| 3,667,914 | 6/1972 | Penquite | 23/232 R |
| 3,718,437 | 2/1973 | Paloniemi | 23/253 R |

Primary Examiner—James H. Tayman, Jr.

[57] ABSTRACT

An apparatus for rapidly testing catalyst samples wherein a vertical reactor surrounded by a heat transfer medium and containing a removable catalyst support is arranged for loading catalyst through the reactor top and for its removal through the bottom after testing. A preheater section is provided for preheating the reactant feed stream. It interconnects with the reactor between the catalyst inlet and outlet ports.

3 Claims, 2 Drawing Figures

CHEMICAL REACTOR

This invention relates to an apparatus for testing different catalysts and reaction conditions for various gas phase reactions. It also relates to a method for contacting a fluid stream with solid contact material under controlled temperature conditions.

For a long time it has been recognized that to find new and better solid contact catalysts for chemical reactions it is necessary to evaluate numerous, perhaps thousands, or different catalysts and reaction conditions. Such evaluation begin in the laboratory where small samples of the many different experimental catalysts are screened. Because of the large number of laboratory tests required it is desirable to have a test that allows (1) rapid, accurate and quantitative intercomparisons among catalysts, and (2) reliable design information for large scale catalytic reactors.

A suitable method depends largely on the suitability of the apparatus used. In many present test evaluation methods the test reactor is packed from the bottom up. As one example, first quartz wool is inserted into the reactor to provide a bed support, then inert quartz chips are added to improve gas flow distribution and minimize end temperature effects; some additional inert chips are then added on top of the catalyst to provide a preheater section. The packed reactor is placed in a special furnace and connected to the feed gas source and temperature-measuring devices. The temperature is brought to the desired level, taking considerable time to heat up. The evaluation tests are made, the furnace is cooled, the reactor disconnected, removed and emptied. Catalyst is segregated from inert packing. Each step of the process is time consuming and defeats the goal or rapid as well as accurate cartalyst testing. Furthermore, since the temperature-measuring device is usually positioned axially in the center of the bed, the temperature profile through the bed is usually not known; yet such profile can have a profound effect on comparisons between two catalysts of slightly differing activities when reactions are exothermic or endothermic.

In other apparatus, electrical heaters may be wound directly on the reactor-or the reactor placed in a furnace. In such instances the low heat capacity of the reactor wall results in relatively wide swings in reactor temperature both radially and along the axis, and concomittant temperature fluctuations of catalyst particles touching the wall of the reactor occur. The air gap between a furnace block and the reactor wall provides a thermal resistance that frequency masks the true reactor wall temperature and therefore masks some of the catalyst particles temperature within the reactor.

The important requirements and goals of a suitable apparatus are given in the following paragraph. Not all of these features are achieved in the usual test methods or usual test apparatus.

First, it should be possible to rapidly test a large number of catalysts for activity under precisely defined temperatures and preferably under isothermal temperature conditions. To reduce the quantities of each new experimental catalyst that must be prepared, it is desirable to be able to obtain accurate information from small samples of only a few grams. Provision for cross contamination of one catalyst with the previous one must be avoided without slowing the testing process. The catalyst tested should be of the same particle size and activity to be used commercially. Testing should be under isothermal conditions because small differences in temperature can greatly affect activity, and different temperature gradients within the different catalyst beds during testing can lead to deceptive comparisons. The rate of reaction data for reactor design requires measurement of activity and selectively under widely differing but well defined flow rate and temperature conditions. Application of such information to reactor design by well known kinetic analysis methods requires reliable isothermal data. Finally, the settling (or sifting down) of catalyst particles during testing should not create a void space that will allow the gas flow to bypass the catalyst particles as does often occur in horizontally packed tubes.

The subject invention provides a novel apparatus and test method for achieving the above mentioned goals.

With the subject invention, catalyst can quickly be removed from the apparatus and a new sample added without losing time in cooling and reheating the reactor. It is not necessary to remove the reactor from the heat source to change catalyst samples. An unobstructed reactor vertical section provides for complete catalyst removal, eliminating cross contamination. Furthermore, the sharp downward angle at which the preheater tube enters the reactor tube prevents catalyst from falling into the preheater during loading; the tube angle allows any particles caught during loading to slide out, thereby confining all catalyst or solid contact material to the catalyst chamber. The reactor tube is of narrow diameter, its inside diameter preferably chosen so that each catalyst particle is in contact with the tube wall. Thus the rate of heat transfer from catalyst and fluid in the solid contact material chamber is as high as possible for the sample being tested. Heat at the reaction tube wall is added or dissipated by means of a fluid bath or a solid back of high thermal conductivity metal cast around the reactor tube to provide a constant temperature along the reactor wall as well as to transfer heat to or from it. Further aid to the achievement of isothermal conditions is provided by a gas preheater tube cast in the same contiguous metal block as the reactor, thereby preventing cooling of feed gas on transfer from the preheater to the reactor tube. In the vertical reactor any settling does not open a bypass for gas to shoot past the particles unconverted as can happen in a horizontal reactor.

Figure 2:
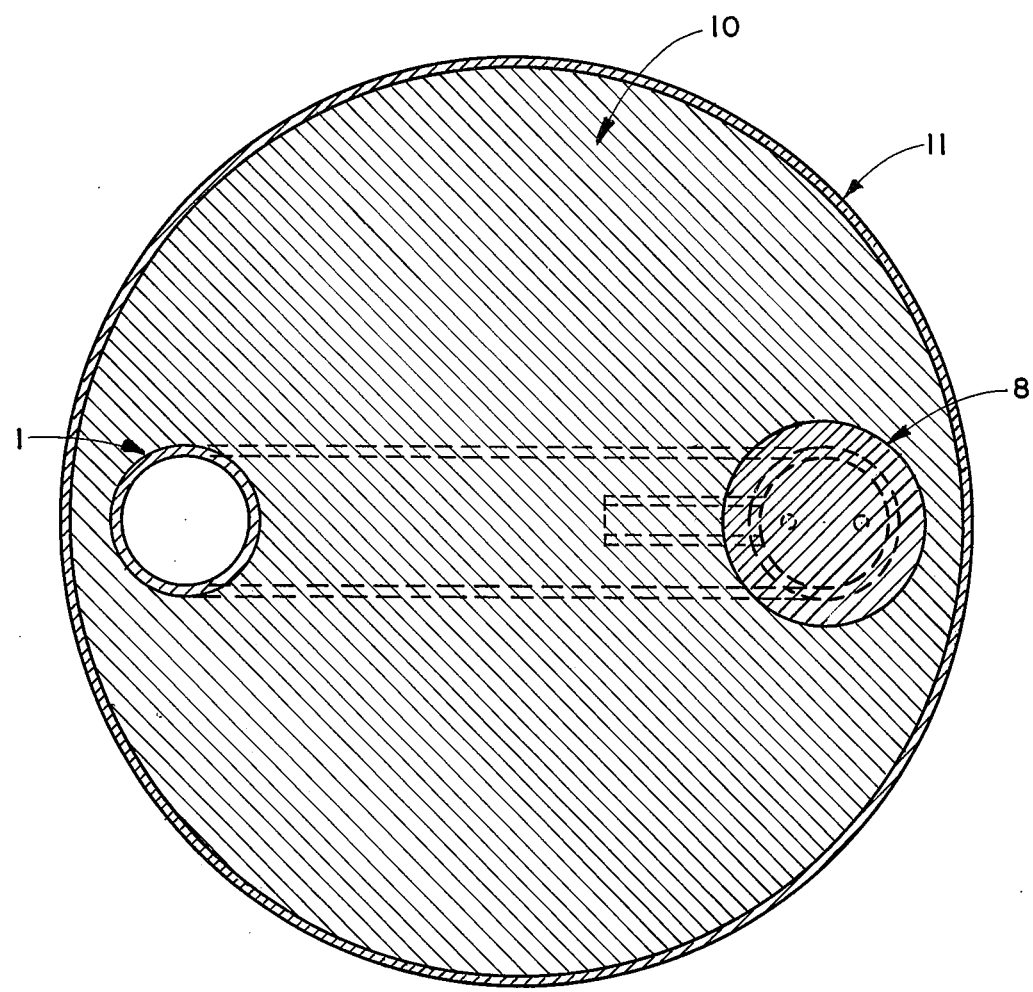

These essential features of the invention are illustrated in FIGS. 1 and 2, which are respectively elevation and top views of the apparatus.

In FIG. 1, the reactor section 3 with interconnecting preheater 2 is surrounded by a cast aluminum block 10 and contains catalyst in the solid contact material chamber 9 supported by the removable perforated retaining plate 6. Retaining plate 6 is attached to cap 5 by rod 7 and is removable with cap 5. Metal block 10 is maintained at constant temperature by controlling electrical heater 13. Pot 11 is a stainless steel pot into which molten metal is poured to make the cast block 10 and which provides a surface for receiving heat from heater 13 for temperature control. The apparatus is supported on legs 12 which provides space beneath the reactor to remove the retaining plate 6 by unscrewing cap 5 and lowering it to allow catalyst to fall out of the reactor tube 3.

The preheater tube portion 2 enters the reactor tube 3 in a downward direction forming an acute angle of about 30° with the vertical axial center line of the tube 3 above its junction with 2. The joint between the preheater tube and the reactor tube is preferably a welded one.

There are, in combination in the apparatus, several openings that are an essential feature of the invention. One of these openings is the inlet opening 16 between the preheater tube 2 and the reactor section 3 said opening being located within the boundaries of the heat transfer medium. Preheated feed enters the reactor section and then the catalyst chamber through this opening. A second inlet opening is for periodically loading catalyst into the catalyst chamber. This opening is defined as the open crossection section at point 15 on the drawing and is also located within the boundaries of the heat transfer medium. A third opening is the reactor opening closed by removable cap 5 and through which the removable solid contact support 6 may be removed to unload the solid contact material or catalyst.

Another important feature of this invention is the means provided for preheating. In conventional reactor systems preheating is provided by either a separate preheater system or by heat exchanging incoming feed with effluent stream. Neither of these methods will provide the degree of isothermality achievable with the subject apparatus in which the reaction chamber and preheater section are heated by the same contiguous constant temperature heat transfer medium. A separate heater is undesirable because it allows fluid to cool between heater and reactor. Heat exchange of influent with effluent causes the inlet reactor temperature to be too high for exothermic reaction and too low for endothermic reactions with respect to the desired isothermality.

Typically the ratio of the preheater section volume to catalyst chamber volume lies in the range of 2 to 100 where both volumes are measured as those lying within the same contiguous heat transfer medium boundaries. Volume of the catalyst chamber is that space between the removable support and the point in the reactor where the bottom of the preheater section enters. The large preheater volume is needed to preheat the feed stream to precisely the heat transfer medium temperature.

Three other important characteristics of this apparatus are, first, that the upper and lower ends of the reactor are section above and below the top and bottom boundaries of the heat transfer medium. Second, the reactor section contains within it no obstruction to the free fall of catalyst particles. Thus when the reactor section is open at top and bottom, a catalyst particle dropped in the top freely falls past the portion of such tube in direct contact with the heating medium 10 and out of the bottom. Third, the acute angle at which the preheater tube 2 enters the reactor tube 3 prevents catalyst from dropping into the preheater tube when catalyst is dropped into the reactor.

The method for operating the apparatus further illustrates the invention. Still referring to FIG. 1, with the apparatus as shown there but not containing catalyst 9, feed gas flow into the preheater 1 is stopped. The temperature of the metal block 10 is set to the desired level for the next test by adjusting voltage to heater 13. Cap 8 is removed by unscrewing. A sample of catalyst is added through the top of 3 falls through opening 15 and comes to rest on retaining place 6. The cap 8 is replaced. Feed gas flow into the preheater 1 is started and such gas flows through opening 16, through the catalyst bed 9 and exits through outlet 4. The gas stream conversion produced by contact with the catalyst is determined by analyzing gas leaving the apparatus through 4. The gas stream conversion produced by contact with the catalyst is determined by analyzing gas leaving the apparatus through 4. From such an analysis for two or three tests made at varying low rates, the catalyst activity can be determined by well known methods.

After the measurement of conversion at several corresponding flow rates, the catalyst test is complete and the following steps are then taken to test the next catalyst. Cap 5 with attached retaining plate 6 is unscrewed and removed. Catalyst 9 falls out of the reactor section. Cap 5 with attached retaining plate 6 is replaced. The apparatus is now empty and ready for testing another catalyst by repeating the operation just described. Thus, testing numerous catalyst samples is rapid.

Referring to FIG. 1, the apparatus may be constructed in different sizes. The reactor section 3 conveniently is a tube that may vary from 0.3 to 6 feet long, with 2 feet being the usual satisfactory length. The reactor may or may not be of uniform cross section throughout its length. The cross section may be circular, square, or another shape, as long as it is unobstructed from top to bottom. Unobstructed means that a particle dropped in the top will fall out the bottom if the movable support and bottom cap are removed from the apparatus. The weight of catalyst sample charged to the reactor will normally vary up to 100 grams, but most commonly will be in the range of 1 to 10 grams, corresponding to conversions between 10 and 90 percent for catalytic reactions at suitable adjusted gas flow rates.

The dimensions in inches of the apparatus that is particularly desirable are as follows:

| | |
|---|---|
| Preheating tubing | |
| Length in contact with metal block | 36.0 |
| Inside diameter | 0.402 |
| Outside diameter | 0.500 |
| Reactor tube | |
| Length | 24.0 |
| Inside diameter | 0.402 |
| Outside diameter | 0.500 |
| Length protruding from top of metal block | 2.0 |
| Junction - reactor tube and preheater tube | |
| Distance below top of metal block | 4.0 |
| Metal block | |
| Diameter | 3.1 |
| Length | 18.0 |
| Retaining screen rod (7) | 6.0 |
| Distance between top of block and top of pot | 1.0 |

Suitable material for the pot is stainless steel. For most applications stainless steel is also suitable for the tubes.

The range of inside diameters for reactor tube 3 is from 0.17 to 1 inch; outside diameters between 0.25 and 1.25 inches. The best inside diameter for tube 3 is one and one-half times the average catalyst particle diameter when no axial thermocouple is used. For uniformly sized particles the average particle diameter is taken as the calculated diameter of a sphere having the same weight and particle density as the actual catalyst particle with air in the porous internal structure. For non-uniform particles the individual particle diameters are averaged. For general purpose catalyst testing, an internal reactor diameter of 0.402 inches has been found to be satisfactory for most systems. Very small particles may be diluted with inert particles to achieve isothermal condition. When the reactor tube diameter is less than three average particle diameters test conditions are nearly isothermal.

Normally there is no need to insert a thermocouple into the catalyst because catalyst is touching the wall at the reactor wall temperature, and the reactor wall temperature and metal block temperature are the same. Temperature of the block is measured in thermowell 14. Because th heat capacity and transfer rate through the metal block are much higher than the heat effects associated with preheating feed gas or the usual heat of reaction, the block is easily controlled at constant temperature and causes reactor wall temperature to be constant. Where liquids are to be vaporized it is desirable to do so in a separate apparatus to assure that feed gas entering tube 3 is completely vaporized.

In this invention disclosure isothermal conditions means that the temperature of the catalyst particles is no further than 6° C from the reactor wall temperature. Such temperature is as close to the measured temperature of the reactor wall as is reasonably possible in integral bed type reactors because, without changing the physical or chemical properties of the catalyst, or the gas flow rate beyond the regime where commercially desired conversions are achieved, the maximum rate of heat transfer is achieved. For a reactor to particle diameter ratio of 3, microthermocouples have shown that the surface temperature of many reactions is within 2° C. of the wall temperature in such is such isothermal testing. For highly exothermic reactions, such as oxidation of 1% CO in air over ¼ inch copper chromite, the difference may be 6° C. Conventional reactors show temperature rises as high as 100° C. Catalyst particles may be conveniently diluted with inert material to attain isothermal conditions in the subject invention. Where closer approach to isothermal conditions is required, the apparatus may be used as a differential reactor in which conversion across the bed is limited by injection of reactants into a recycling flow of bed effluent at a very high flow rate.

The preheater tube 1 may have a diameter that is different than the reactor tube 3. The diameter of the metal block 10 varies from 2 to 14 inches depending on how many reactor-preheater tube units are integrated into a single metal block.

Suitable materials for the cast block are aluminum and aluminum alloys, copper and copper alloys such as brass, and bronze. Preferable materials of construction for the reactor and preheater tubes are ferrous alloys such as stainless steel or nickel, or nickel alloys, although depending on the reaction, copper, brass and other materials may be used for units operating below about 300° C. The melting point of the tube metal must be higher than that of the block metal. Pure aluminum is the preferred block metal because of its moderate melting point for handling ease coupled with high thermal conductivity.

The block is cast by pouring molten metal into pot 11, into the bottom of which pot a tube 3 has been welded or otherwise fixed at point 15. It is also possible to position the preheater and reactor tubes in a sand mold, and pour molten metal into that mold to form the block. The essential feature of aluminum heat transfer medium 1 is that it is cast in place and is continuous throughout the heat transfer zone for both the preheater and the reactor.

There are a number of equivalents of this design. For example, the preheater tube 1 may be a spiral coil rather than the U tube type design as shown. While the angle between the preheater tube and reactor tube is desirable 30° as mentioned previously, in order to keep catalyst out of the preheater section during charging, it may be at other angles. If care is taken to add catalyst piece by piece it may even be perpendicular to the reactor tube. The suitable range for this angle therefore lies between about 10° and 90°.

The entire apparatus may be used in the horizontal rather than the vertical position. The arrangement of tubes within the block is not critical but distance between them is preferably at least one tube diameter.

The operating temperature range is from ambient up to about 1800° F depending on the volatility of the heat transfer medium. For an aluminum block 1100° F is a desirable operating temperature limit, although a molten aluminum bath is suitable for operation at 1600° F and higher.

With a ½ inch diameter reactor tube having an inside diameter of 0.402 inches, typical test catalysts that may be charged to the apparatus are copper chromite cylindrical tablets, 3/16 inch diameter and 3/16 inch long; beads of silica-alumina cracking catalyst about ¼ inch in diameter, and activated carbon granules of 6 – 8 mesh size. Platinum reforming catalyst extrudate, 1/16 inch in diameter, may also be conveniently tested. Typical of the fluid streams passed over such catalysts are vaporized methoxypropanol in hydrogen, vaporized hydrocarbons, and gaseous mixtures of cyanogen chloride and chlorine.

Other variations in this apparatus include allowing the lower U bend portion of the preheater tube 1 to extend through the bottom of the pot 11. Such design allows removal and replacement of the U bend should extensive mechanical cleaning of the tubes ever be necessary.

The illustrated retainer place 6 is one of many solid contact supports that are suitable. It may be a perforated plate, a screen, or other device that supports the catalyst in place while passing gas to the exit 4. For very fragile catalysts it may be desirable to attach a retainer plate to the top reactor cap so that catalyst can be gently lowered into the reactor.

Another type of support is an inner reactor tube open at the top and with a perforated bottom and cross section. Catalyst is loaded into this tube and the entire tube is inserted into 3, the top of such tube suitably fitted to close the top of 3. In such a device preheated gas flows into the bottom of the inserted tube, through the top of the inserted catalyst support tube. In this embodiment the bottom of 3 is closed except to uncap it for occasional clean out.

The heater that has been found to be effective for a 12 pound aluminum block size is a 1000 watt ceramic beaded Chromel A resistance wire would around pot 11. Block temperature is controlled by adjusting the voltage on the heater with a transformer, or operating a temperature controller from thermowall 14. Normally the heater is covered with thermal insulation, not shown in the Figures.

Provision for rapid cooling may be made by adding a cooling coil to the assembly before pouring the molten metal into the pot or mold. To cool, air is passed through the coil so incorporated into the block.

The apparatus described is also useful for a number of non-catalyst related applications because of its characteristic of having a reactor tube in intimate contact with a high thermal conductivity solid metal block. Such a system provides excellent temperature control, over a wide temperature range, for many reactions on the laboratory scale. It is useful also for obtaining adsorption isotherms and dissociation pressures where fluids are passed over solid contact material under closely controlled isothermal conditions.

When the apparatus is made for use at low temperatures, heat transfer mediums other than aluminum metal may be used. In that case the space in pol 11 contains, instead of an aluminum block, a contiguous fluid heat transfer medium ordinarily used in constant temperature baths. Such mediums may be water, glycerine, molten sodium nitrate-potassium nitrate eutectic mixture, oil, molten lead or fluidized solids agitated or fluidized by a gas sparger inserted into the bottom of the pot from the top. Such alternate heat transfer mediums offer certain disadvantages, however, that make them less desirable for many applications than the aluminum heat transfer medium. The vapors from liquids near the boiling point, fumes from vaporization and decomposition, the creeping of salt out of its container, and regulation and flow of air and stray solid particles from the apparatus are a nuisance. The fluidized solds medium, such as fluidized silica-alumina cracking catalyst is suitable for temperatures to around 1800° C if abrasion and sensitivity to fluidization regulation can be tolerated. Furthermore, such materials are a safety hazard in that they are susceptible to spills and splattering which may cause personal injury. Under certain conditions, however, such materials may be used as the heat transfer medium for the catalyst test reactor.

The two essential features which make possible rapid testing under controlled temperature conditions are the preheater size and construction, and the removable support construction. The large preheater size relative to the solid contact material chamber size coupled with the preheater position in the same highly conductive heat transfer medium as the reactor permits the feed stream to be preheated to the exact desired testing temperature before it enters the solid particle bed, a condition required for isothermal testing. The acute angle at which the preheater section enters the reactor coupled with the removable support makes it possible to change the sample of solid particles rapidly as described previously.

Having described this invention, I desire to secure and claim by Letters Patent the following:

1. In an apparatus for contacting a fluid stream with a particulate solid contact material a supported heat exchange body, temperature regulating means surrounding said heat exchange body, a vertically disposed open ended tube extending through said heat exchange body, upper closure means and lower closure means for said tube, a support means attached to said lower closure and extending into said tube and a supply conduit dispsed in said heat exchange body opening into said tube above said support means and below said upper closure means.

2. The apparatus of claim 1 wherein the heat exchange body is a mass of aluminum metal or a container of molten salt or fluidized solid particles.

3. The apparatus of claim 2 wherein the temperature regulating means is an electric heater.

* * * * *